(12) United States Patent
Rick

(10) Patent No.: US 9,221,411 B2
(45) Date of Patent: Dec. 29, 2015

(54) GASBAG FOR A PERSONAL PROTECTION DEVICE

(71) Applicant: GM GLOBAL TECHNOLOGY OPERATIONS LLC, Detroit, MI (US)

(72) Inventor: Ulrich Rick, Braunweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 221 days.

(21) Appl. No.: 13/720,718

(22) Filed: Dec. 19, 2012

(65) Prior Publication Data

US 2013/0154247 A1    Jun. 20, 2013

(30) Foreign Application Priority Data

Dec. 20, 2011    (DE) .......................... 10 2011 121 724

(51) Int. Cl.
| | |
|---|---|
| *B60R 19/54* | (2006.01) |
| *B60R 19/20* | (2006.01) |
| *B60R 21/235* | (2006.01) |
| *B60R 21/36* | (2011.01) |
| *B60R 21/205* | (2011.01) |

(52) U.S. Cl.
CPC ............. *B60R 19/205* (2013.01); *B60R 21/235* (2013.01); *B60R 21/36* (2013.01); *B60R 21/205* (2013.01); *B60R 2021/23504* (2013.01)

(58) Field of Classification Search
CPC .............................. B60T 11/103; B60K 28/06
USPC ................. 280/274, 735, 743.2, 743.1, 728.1; 180/271
See application file for complete search history.

(56) References Cited

U.S. PATENT DOCUMENTS

| | | | |
|---|---|---|---|
| 4,099,759 A * | 7/1978 | Kornhauser .................. 293/110 |
| 5,431,463 A * | 7/1995 | Chou ............................ 293/110 |
| 5,443,285 A * | 8/1995 | Boll .............................. 280/732 |
| 6,497,302 B2 | 12/2002 | Ryan | |
| 7,566,670 B2 * | 7/2009 | Heuschmid .................. 442/181 |
| 7,648,158 B2 * | 1/2010 | Hasebe ......................... 280/729 |
| 2005/0218640 A1 | 10/2005 | Kokeguchi | |
| 2009/0289471 A1 * | 11/2009 | Finney ..................... 296/187.04 |

FOREIGN PATENT DOCUMENTS

| | | |
|---|---|---|
| DE | 19713595 C1 | 8/1998 |
| DE | 102004027171 A1 | 12/2005 |
| DE | 102005053960 A1 | 5/2006 |
| DE | 102008049504 A1 | 4/2010 |
| EP | 1982872 A2 | 10/2008 |
| EP | 2199062 A1 | 6/2010 |
| JP | 2006137323 A | 6/2006 |

(Continued)

OTHER PUBLICATIONS

German Patent Office, German Search Report for Application No. 102011121724.3 dated Aug. 7, 2012.

(Continued)

*Primary Examiner* — John Walters
*Assistant Examiner* — James Triggs
(74) *Attorney, Agent, or Firm* — Ingrassia Fisher & Lorenz PC

(57) ABSTRACT

A gasbag for a pneumatic personal protection device on a motor vehicle is provided. The gasbag has a membrane at least locally comprising an inner layer and an outer layer that exhibits a higher tolerance to a frictional load than the inner layer.

15 Claims, 3 Drawing Sheets

(56) References Cited

FOREIGN PATENT DOCUMENTS

| | | |
|---|---|---|
| JP | 2006240476 A | 9/2006 |
| JP | 2006256446 A | 9/2006 |
| JP | 2006256485 A | 9/2006 |
| JP | 2006264388 A | 10/2006 |
| JP | 2006273040 A | 10/2006 |
| JP | 2006273133 A | 10/2006 |
| JP | 2006273136 A | 10/2006 |
| JP | 2006273137 A | 10/2006 |
| JP | 2006273139 A | 10/2006 |
| JP | 2010163015 A | 7/2010 |

OTHER PUBLICATIONS

Search Report dated Apr. 4, 2013 in GB 1221963.0.

* cited by examiner

GASBAG FOR A PERSONAL PROTECTION DEVICE

CROSS-REFERENCE TO RELATED APPLICATION

This application claims priority to German Patent Application No. 102011121724.3, filed Dec. 20, 2011, which is incorporated herein by reference in its entirety.

TECHNICAL FIELD

The technical field relates to a gasbag for a pneumatic personal protection device on a motor vehicle, as well as to a motor vehicle equipped therewith.

BACKGROUND

Gasbags or airbags can be sheathed and integrated into various hollow spaces on a motor vehicle, from which they must expand as rapidly as possible when needed, so as to establish a buffer between hard sections of the motor vehicle body and persons that might need to be protected, in particular passengers inside the vehicle or pedestrians. Such a gasbag is exposed to significant mechanical loads not just at the moment where it cushions a person in an expanded state, but conceivably even before that point, e.g., when the expanding gasbag has to force its way out of its installation space into the open through a narrow opening, during which it is exposed to potentially significant friction at the edges of the opening. In particular given a gasbag for protecting pedestrians, strong frictional loads can also arise when it is pressed against the roadway during its expansion or even only after cushioning a pedestrian. If the frictional load tears open the gasbag, it becomes ineffective.

It is at least object to improve the operational reliability of such a gasbag. In addition, other objects, desirable features and characteristics will become apparent from the subsequent summary and detailed description, and the appended claims, taken in conjunction with the accompanying drawings and this background.

SUMMARY

In an exemplary embodiment, the membrane of a gasbag at least locally encompasses an inner layer and an outer layer, which exhibits a higher tolerance to a frictional load than the inner layer.

Such an elevated tolerance can come about in different ways, e.g., by using a material with a low coefficient of friction and/or higher resistance to wear for the outer layer, or, while accepting the wear on the outer layer, instead giving it thick enough dimensions to protect the inner layer against a frictional load for at least the time it takes the gasbag to decelerate a person impacting it.

At least in the areas of the membrane that are expected to be exposed to wear and preferably also a bit beyond that, the outer layer can form a closed layer, so as to protect the inner layer over its entire threatened region. For example, such a closed layer can be composed of a lubricant like fat or wax, which is slightly abraded when in contact with a frictional surface; however, it can also be a low-abrasion layer consisting of a durable material like aramide, wherein the closed nature of the layer here prevents projections of a frictional surface from potentially getting caught in the layer and ripping it open.

In order to economize on installation space, it may be best for the outer layer to be comprised of discrete wearing bodies individually secured to the inner layer. Even if they do not completely cover the inner layer with the gasbag in an expanded state, the latter can effectively keep it away from a frictional surface.

In order to prevent the wearing bodies from getting caught on projections of a frictional surface, it may be best to scale the wearing bodies.

The wearing bodies can be adhesively bonded to the inner layer of the membrane; if the membrane exhibits openings, in particular if the membrane is a fabric and the openings are gaps between threads of the fabric, effectively anchoring the wearing bodies may involve having them exhibit fastening sections that pass through openings in the inner layer.

In another modification, the outer layer can also be designed as a fabric.

The outer and inner layer can also be joined together to form a uniform fabric.

Varying tolerances to a frictional load for the outer and inner layer can be obtained in particular by having the inner layer and outer layer be comprised of different types of threads.

A high tolerance to frictional loads can be achieved by having the outer layer consist at least partially of aramide or PTFE.

In another exemplary embodiment, a motor vehicle with a gasbag of the kind described above is provided. Such a gasbag for protecting pedestrians can be arranged on a bumper, in particular the front bumper, of the motor vehicle.

In a gasbag for protecting pedestrians, in an embodiment the outer layer is provided on at least a part of the membrane that faces the roadway in an expanded state, and can come into frictional contact with the latter. Parts of the gasbag facing away from the roadway preferably do not exhibit the outer layer, so as to minimize the space required by the gasbag when not expanded and its weight.

If the gasbag is arranged in such a way as to expand through an opening, in an embodiment the outer layer is provided on at least a part of the gasbag that comes into frictional contact with an edge of the opening during expansion. Once again, parts of the gasbag for which there is no risk of frictional contact are preferably free of the outer layer.

Structured surfaces often exhibit an anisotropic coefficient of friction. Since the direction in which the gasbag moves relative to a frictional surface is generally determined by its installation, it is possible to orient the membrane of the gasbag in such a way that it moves, if necessary relative to the frictional surface, in the direction where its coefficient of friction is minimal.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background of the invention or the following detailed description.

Figure 1:
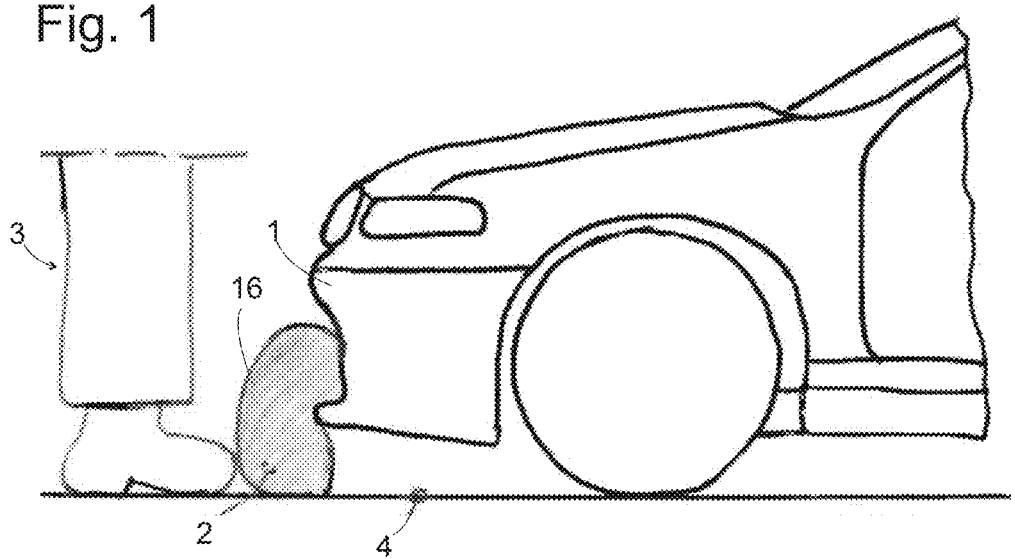
FIG. 1 is a schematic side view of a front portion of a motor vehicle according to a first embodiment.

FIG. 1 shows the front portion of a motor vehicle in a first typical situation involving a gasbag as contemplated herein. A large segment of the front portion of the motor vehicle is taken up by a bumper 1 made out of plastic. The front side of the bumper 1 exhibits a pocket or recess not visible on the figure, which incorporates a gasbag 2 in a tightly folded configuration and a pyrotechnic gas generator for supplying gas to the gasbag 2, if necessary protected by a lid. A control circuit known in the art (not shown) is provided for igniting the gas generator if a strong collision pointing to contact between the driving vehicle and an outside obstacle, such as a pedestrian 3, was registered or, preferably, if an approach toward such an obstacle at a speed roughly corresponding to the traveling velocity of the motor vehicle was registered. In the latter case, the gasbag 2 can expand even before the vehicle touches the pedestrian 3, and thereby achieve the configuration depicted on FIG. 1.

The expanded gasbag 2 extends to the bottom beyond the lower edge of the bumper 1, and as a consequence is diverted downward by the turbulence, against the road surface 4. In this way, the gasbag 2 engages the legs of the pedestrian 3 at a slight distance from the road surface 4, reliably preventing the latter from being pulled under the vehicle. On the other hand, given a more prolonged, tight contact between the gasbag 2 and road surface 4, there is a danger that it will be abraded and become less effective if no suitable countermeasures are taken. Examples of such countermeasures will be outlined below based on FIG. 3.

Figure 2:
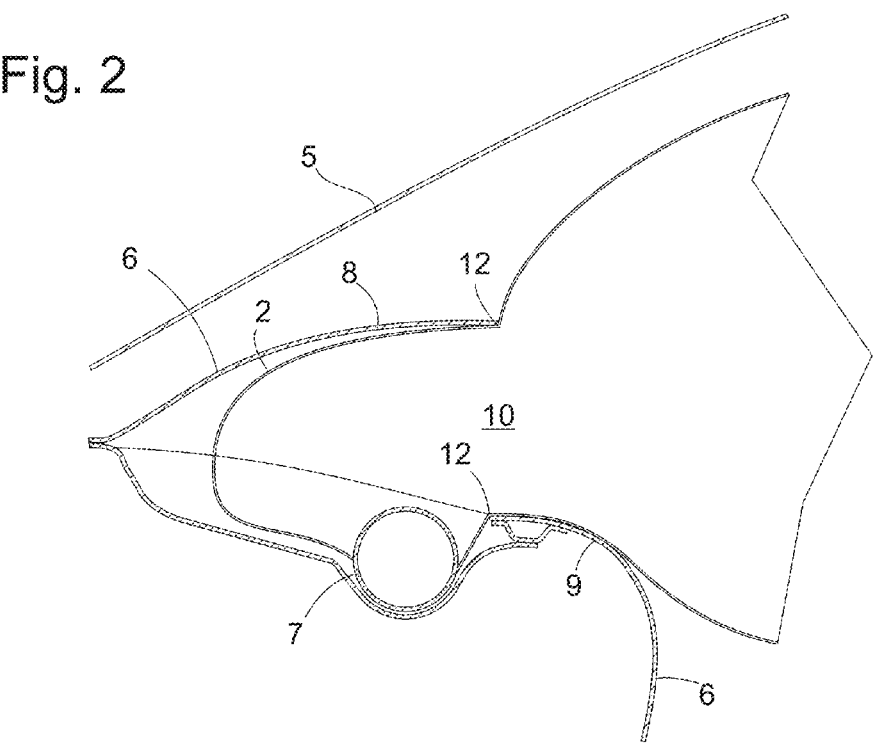
FIG. 2 is a schematic cross section through the dashboard of a motor vehicle according to a second embodiment.

FIG. 2 shows a second, typical situation involving a gasbag contemplated herein. A dashboard panel 6 is located under a sectionally depicted windshield 5 of the motor vehicle. In an idle state, a gas generator 7 and folded gasbag 2 are accommodated inside the dashboard, and an elongated weak point is formed in the dashboard panel 6. When the gas generator 7 is actuated and the gasbag 2 begins to expand in response to a strong collision, the dashboard panel 6 tears along the weak point under the pressure exerted by the gasbag 2. An outlet opening 10 forms between the upwardly diverted section 8 and an immovable section 9 of the panel 6, through which the gasbag 2 penetrates into the passenger cabin, and continues to expand there. The edges 12 of the outlet opening often have sharp edges given the way they come about, and parts of the membrane of the gasbag 11 that are abraded over the edges 12 as the gasbag 11 exits the opening 10 run the danger of becoming damaged in the process if they have no suitable protection.

Figure 3:
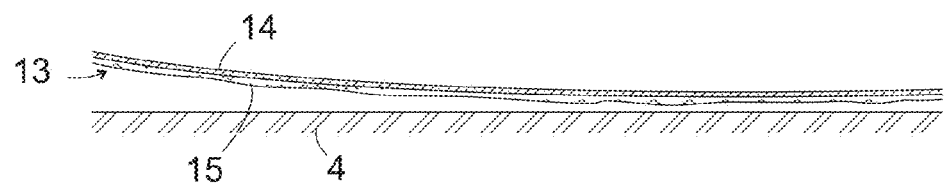
FIG. 3 is a first exemplary embodiment for the structural design of the membrane of a gasbag in a schematic section.

FIG. 3 shows a schematic section through a cutout of the expanded gasbag 2 according to a first exemplary embodiment. A flexible membrane 13 forming the outer wall of one or more chambers of the gasbag 2 encompasses an inner layer 14 and an outer layer 15 in a region facing the road surface 4 in the expanded state. The inner layer 14 can be a tight fabric, a film or a composite material, such as a film comprised of rubbery elastic material, which is limited in terms of its extensibility by an embedded fabric layer. The outer layer 15 is here a layer of fat or wax. While such an outer layer 15 can abrade quickly when in contact with the road surface 4, it still provides the inner layer 14 with effective protection if its thickness is dimensioned so as to prevent the inner layer 14 from coming into contact with the road at least until the gasbag 2 has effectively cushioned the pedestrian 3.

In an upper region 16 (see FIG. 1) of the gasbag 2 facing away from the road surface 4 in an expanded state, the membrane 13 lacks the outer layer, so as not to unnecessarily elevate the space required by the gasbag when not expanded in the idle state. As an alternative, the outer layer 15 can also be a film made out of a tough, flexible material, such as aramide. Such a film can be adhesively bonded with the inner layer 14 over a large surface, or a film can be formed that at least partially penetrates the fabric of the inner layer 14, e.g., by applying an aramide solution to the inner layer 14.

Figure 4:
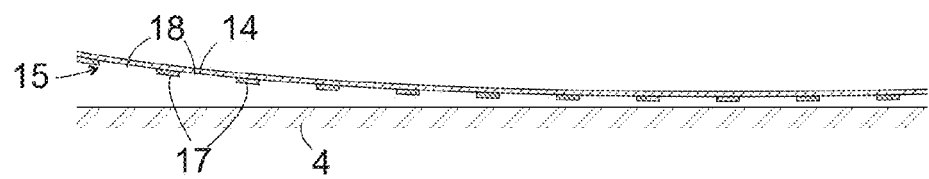
FIG. 4 is a second example for the structure of the membrane in a section analogous to FIG. 3.

In order to achieve a long-lasting resistance to frictional wear, possibly even one that enables a reversal and renewed use of the gasbag 2 for another expansion process, the outer layer 15 may have to exhibit a thickness that would stiffen a continuous film to where it no longer could readily be folded together as tightly as required for the gasbag 2 when in an idle state. One remedy would here be the modification shown on FIG. 4, as a result of which the outer layer 15 is composed of discrete, block-shaped wearing bodies 17 each individually attached to the inner layer 14. The wearing bodies 17 can each be adhesively bonded to the inner layer 14 or, if the inner layer 14 is a fabric, the material of the wearing body 17 can penetrate into respective gaps between the warp and weft threads of the fabric, so as to become anchored in a positively and materially bonded way.

Figure 5:
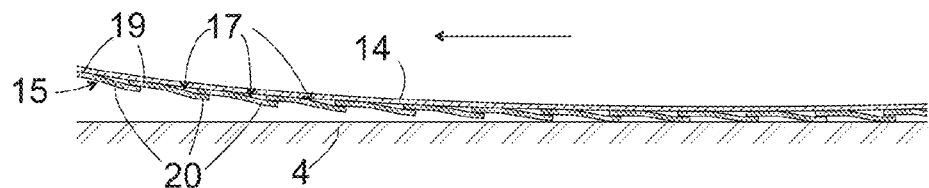
FIG. 5 is a third exemplary embodiment for the membrane structure.

If the wearing bodies 17 are pressed into the inner layer 14 while in contact with the road surface 4, it may happen that the inner layer 14 will still come into contact with the road surface 4 in a gap 18 between two wearing bodies 17. In order to reliably preclude this possibility, the wearing bodies can be scaled, as depicted on FIG. 5, with a respective base section 19 reliably secured to the inner layer 14 via adhesive bonding or penetration through the fabric of the inner layer 14, and a wing 20 that is joined with the inner layer 14 via the base section 19, and whose edge facing away from the base section 19 overlaps the respective base section 19 of an adjacent wearing body 17. The scaled arrangement shown on FIG. 5 is especially insusceptible to a movement by the gasbag 2 relative to the road surface 4, in a direction where the base sections 19 are situated in the front in the direction of movement, and the wings 20 are situated toward the back, i.e., toward the left on FIG. 5, as denoted by an arrow. At the same time, this is also the direction in which the frictional coefficient of the gasbag 2 relative to the road surface 4 is minimal. For this reason, the gasbag 2 should be mounted to the vehicle in such a way that the base sections 19 of the wearing bodies 17 each lie in front of the wings 20 relative to the traveling direction of the vehicle in an expanded state.

Figure 6:
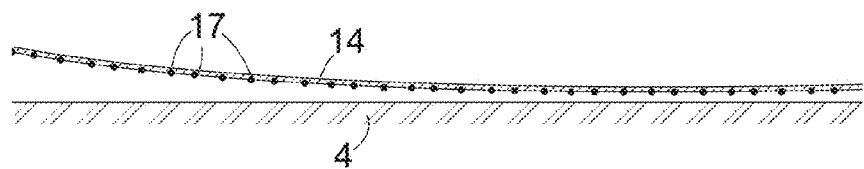
FIG. 6 is a fourth exemplary embodiment.

FIG. 6 shows a variant in which the wearing bodies 17 have a rounded cross section, so as to minimize the danger of getting caught on a projection of the road surface 4. Partially recessing the wearing body 17 in the inner layer 14 while attaching it thereto enlarges the contact surface to the inner layer 14, and thereby provides the wearing bodies 17 with a secure fit.

Figure 7:
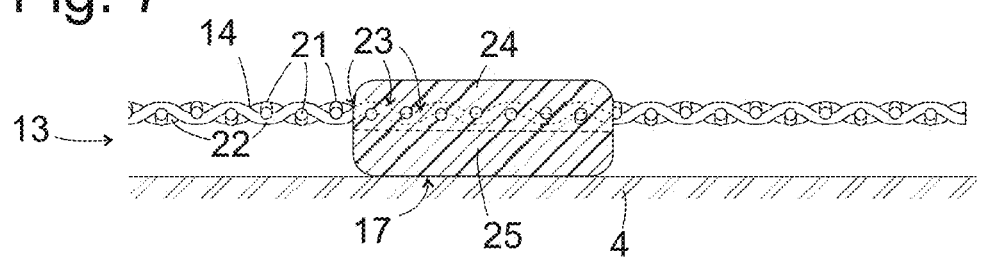
FIG. 7 is a magnified section through a membrane according to a fifth exemplary embodiment.

FIG. 7 shows a cutout from the membrane 13 in a highly magnified, schematic cross section. As clearly evident, the inner layer 14 of the membrane 13 is here designed as a fabric with warp and weft threads 21 or 22. A wearing body 17 is injection molded onto the fabric of the membrane 13, where part of the material of the block 17 has penetrated through the gaps 23 between the threads 21, 22 of the fabric, so that they become locally embedded in a fastening section 24 of the block 17. The outer layer 14 tolerant to abrasive wear is here formed by a wearing layer 25 on the exterior side of the fastening section 24. The wearing layer 25 can be designed as a single piece with the fastening section, or form an especially low-friction or abrasion protective layer over the fastening section 24. In order to keep friction or abrasion low, the wearing layer 25 can be made out of PTFE or aramide, for example.

Figure 8:
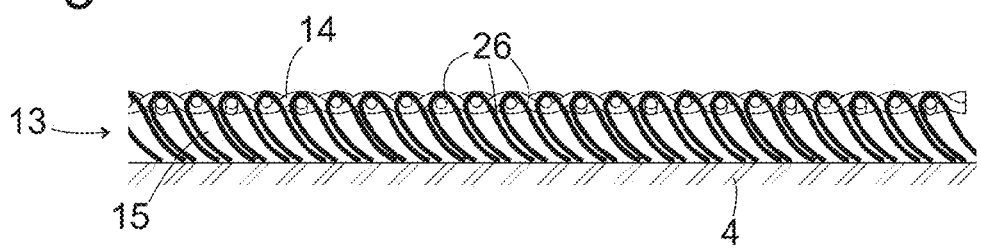
FIG. 8 is a magnified section through a membrane according to a sixth exemplary embodiment.

FIG. 8 illustrates, according to another embodiment, the inner layer 14 of the membrane 13 again designed as a fabric. The fabric here has a pelt-like structure, with incorporated fibers 26, e.g. comprised of aramide, whose free ends form the outer layer 15. Because they become tightly nestled against the inner layer 14 upon contact with the floor, the fibers 56 deliver effective protection against damage while simultaneously ensuring minimal friction.

Figure 9:
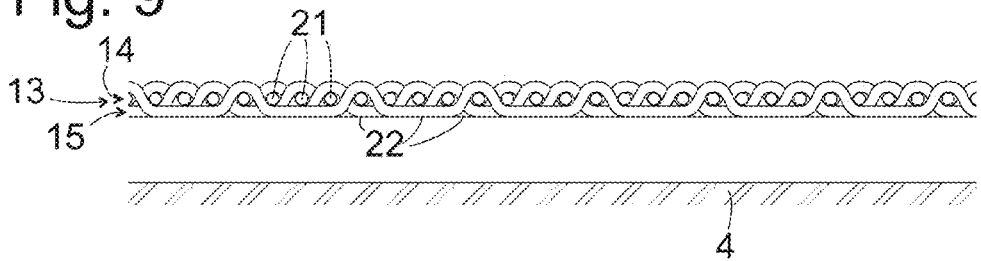
FIG. 9 is a magnified section through a membrane according to a seventh exemplary embodiment.

In the embodiment on FIG. 9, the inner and outer layers 14, 15 are integrated into a uniform fabric. The depicted fabric exhibits a satin weave. This weave is characterized by the fact that warp and weft threads extend essentially on different sides of the fabric and, by each running parallel to each other, generate a high frictional anisotropy. The warp threads 21 shown in section on the figure are kept under a high stress while weaving, so that they are significantly less curved in the finished fabric than the weft threads 22 depicted in a top view. Therefore, the weft threads 22 form only the outer layer 15 facing the road surface 4, and the warp threads 21 only come into contact with the road 4 when the weft threads 22 have largely been abraded. Using a tough, highly resilient material like aramide makes it possible to achieve a strong resistance to friction here as well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A gasbag for a pneumatic personal protection device on a motor vehicle, the gasbag having a membrane at least locally comprising:
    an inner layer; and
    an outer layer that exhibits a higher tolerance to a frictional load than the inner layer, wherein the outer layer comprises discrete wearing bodies individually secured to the inner layer.

2. The gasbag according to claim 1, wherein the outer layer forms a closed layer.

3. The gasbag according to claim 1, wherein the discrete wearing bodies are scaled.

4. The gasbag according to claim 3, wherein the discrete wearing bodies are adhesively bonded to the inner layer.

5. The gasbag according to claim 3, wherein fastening sections of the discrete wearing bodies pass through openings in the inner layer.

6. The gasbag according to claim 1, wherein the outer layer is a fabric.

7. The gasbag according to claim 1, wherein the inner layer is a fabric.

8. A gasbag for a pneumatic personal protection device on a motor vehicle, the gasbag having a membrane at least locally comprising:
    an inner layer; and
    an outer layer that exhibits a higher tolerance to a frictional load than the inner layer, wherein the inner layer and the outer layer form a fabric.

9. The gasbag according to claim 8, wherein the inner layer and the outer layer are formed by different types of threads in the fabric.

10. The gasbag according to claim 8, wherein the outer layer comprises aramide or PTFE.

11. A motor vehicle with a gasbag having a membrane at least locally comprising an inner layer and an outer layer that exhibits a higher tolerance to a frictional load than the inner layer, the outer layer having discrete wearing bodies individually secured to the inner layer, wherein the gasbag is arranged on a bumper of the motor vehicle.

12. The motor vehicle according to claim 11, wherein the gasbag is arranged on a front bumper of the motor vehicle.

13. The motor vehicle according to claim 11, wherein the outer layer is provided on at least a part of the gasbag that faces a road in an expanded state.

14. A motor vehicle with a gasbag having a membrane at least locally comprising an inner layer and an outer layer that exhibits a higher tolerance to a frictional load than the inner layer, wherein the gasbag is arranged in such a way as to expand through an opening, and wherein the outer layer is provided at least on a part of the gasbag that comes into frictional contact with an edge of the opening during expansion, wherein the outer layer exhibits an anisotropic coefficient of friction, and is oriented so as to minimize a coefficient of friction.

15. The gasbag according to claim 1, wherein the outer layer comprises aramide or PTFE.

* * * * *